J. CARNEY.
MARKER OPERATING MECHANISM.
APPLICATION FILED DEC. 4, 1911.
1,077,669.
Patented Nov. 4, 1913.
2 SHEETS—SHEET 2.
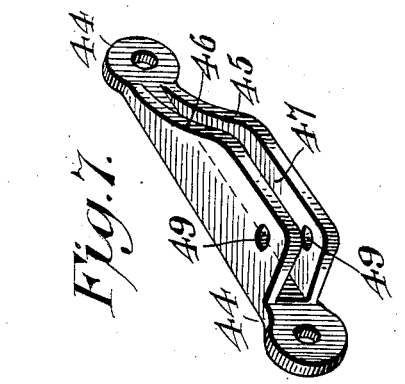
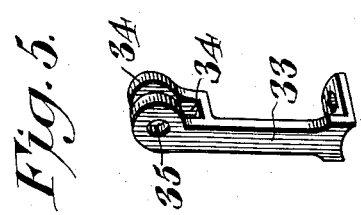
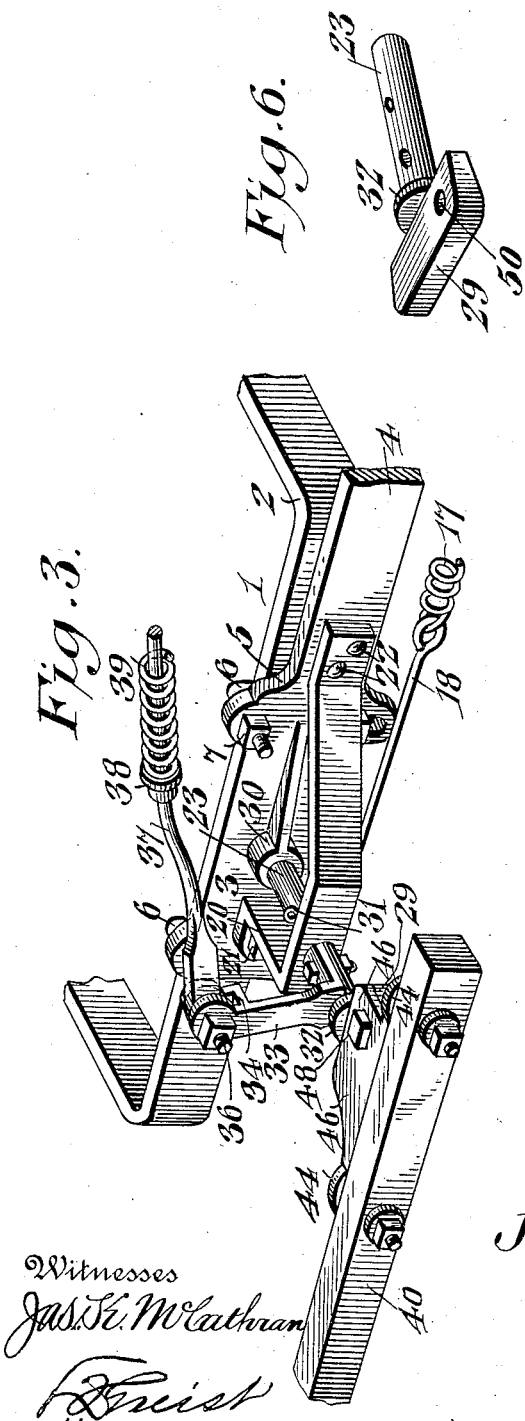
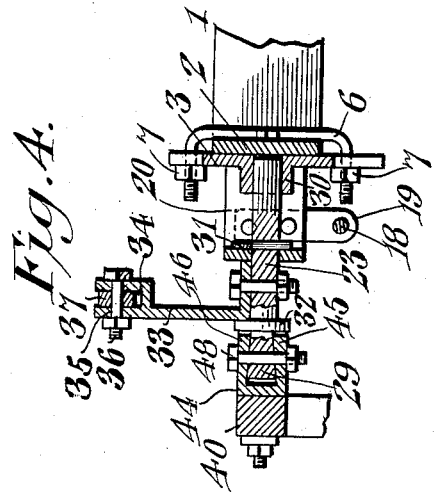
John Carney, Inventor

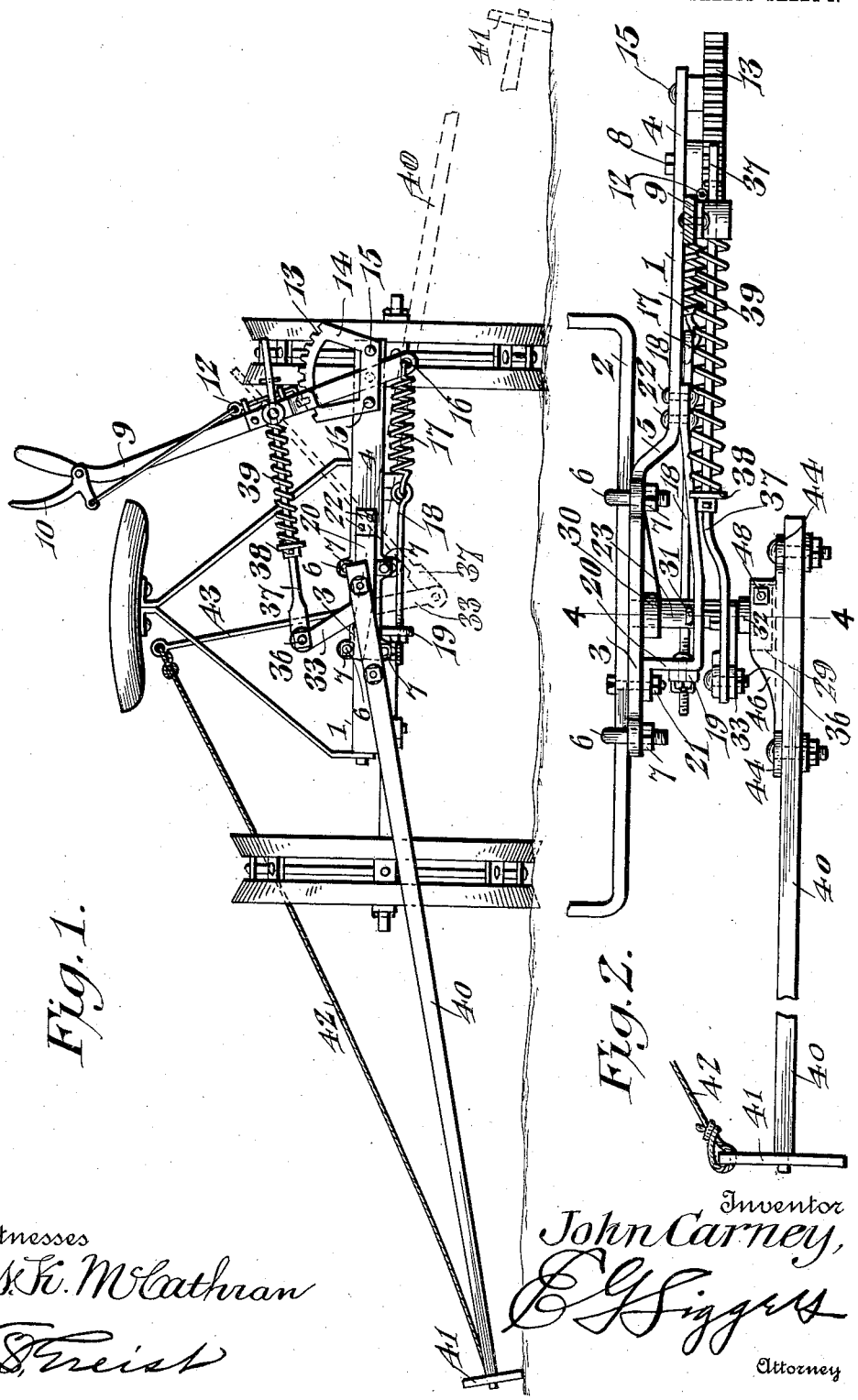

UNITED STATES PATENT OFFICE.

JOHN CARNEY, OF CHATSWORTH, ILLINOIS.

MARKER-OPERATING MECHANISM.

1,077,669.  Specification of Letters Patent.  Patented Nov. 4, 1913.

Application filed December 4, 1911. Serial No. 663,656.

*To all whom it may concern:*

Be it known that I, JOHN CARNEY, a citizen of the United States, residing at Chatsworth, in the county of Livingston and State of Illinois, have invented a new and useful Marker-Operating Mechanism, of which the following is a specification.

The object of the present invention is to improve the construction of devices for raising, lowering and reversing land markers, and to provide a simple and comparatively inexpensive construction of great strength and durability, adapted to be readily applied to an ordinary planter or the like, and capable of convenient operation by the driver to raise and lower the marker to clear a stump or other obstruction, and to reverse the marker from one side of the machine to the other when turning at the end of a row.

My invention has for its particular object an improvement upon that type of marker-operating mechanism disclosed in Patent #992,401 whereby the marker mechanism is protected from injury by inadvertent encounter with a stump or other obstruction.

With these and other objects in view, the invention consists in the construction and novel combination of parts hereinafter fully described, illustrated in the accompanying drawings, and pointed out in the appended claims; it being understood that various changes in the form, proportion, size and minor details of construction, within the scope of the claims, may be resorted to without departing from the spirit or sacrificing the material advantages of the invention.

In the drawings Figure 1 represents a rear elevation of a planter equipped with the preferred embodiment of the invention;
Fig. 2 is a fragmentary top plan view; Fig. 3 is a fragmentary view in perspective showing certain constructional details; Fig. 4 is a section on the line 4—4 of Fig. 2; and Figs. 5, 6 and 7 are detail perspectives of certain of the component elements of the invention.

In the embodiment of the invention illustrated in the accompanying drawings, the marker-operating device comprises in its construction a horizontally-disposed bearing bracket 1, disposed transversely at the rear end of a planter frame 2, and preferably arranged in the same horizontal plane as the frame, as clearly illustrated in Fig. 2 of the drawings. The bearing bracket is preferably composed of two portions 3 and 4 having a substantially parallel relation one to the other and joined by the off-set portion 5. The bracket portion 3 is fitted against the rear of the frame 2 and firmly secured thereto by means of yokes 6 spanning the frame 2 and secured in clamping relation to the bracket member 3 by the nuts 7. The straight portion 4 of the bracket carries a pivot 8 upon which is mounted the operating lever 9 carrying the latch lever 10 operatively connected with the dentent 12 arranged to engage the notches 13 of the toothed segment 14 affixed to the bracket member 1 by the rivets 15. The lower end of the lever 9 is provided with the eye 16 to which is secured one end of the tension spring 17, the other end of which is connected by the adjustable rod 18 to a fixed point of support 19, carried by the frame. A bearing plate 20 is bolted at 21 to the bracket member 3 and the frame 2. This plate extends angularly to the rear of the bracket and frame and thence parallel to said frame and substantially in alinement with the rear face of the bracket member 4 to a point of connection therewith by the rivets 22.

Journaled in the bearing plate 20 and the bracket member 3 at diametrically opposite points, is a stub shaft 23, said shaft projecting rearwardly through the bearing plate and terminating in an elongated narrow crosshead 29 having outwardly flaring sides whereby said crosshead is given a cross section wedge-shaped and tapering inwardly, as shown in Figs. 4 and 6. The rearward withdrawal of the stub shaft 23 from its bearing in the boss 30 on the rear face of the bracket is prevented by a pin 31, arranged transversely of said stub shaft and bearing against the inner face of the bearing plate 20. At the rear of the bearing plate and between said plate and a shoulder 32 formed on the stub shaft adjacent the head 29, is secured an angularly extending crank arm 33, having a bifurcated end 34 provided with an eye 35, which eye is arranged to receive a bolt 36 passing through a similar eye formed on one end of a link 37 connecting said crank arm and the operating lever 9 at a point above its pivotal connection with the bracket member 4. This link is provided with a collar 38, and between said collar and the lever 9 and upon said link is disposed a compression spring 39.

The marker 40 carries at its outer end the usual marker 41 from which a line 42 leads to a point of anchorage forward of the driver such as the rod 43. The inner end of the marker bar is provided on its rear face with a keeper plate 44 having two upstanding parallel flanges 45 and 46 forming between them an elongated recess 47 of a width corresponding substantially to the thickness of the crosshead 29 at its rear edge. The crosshead 29 is adapted to enter the recess 47 and to be hingedly connected to the keeper plate by a bolt 48 passing through the holes 49 of the keeper plate and the hole 50 of the crosshead, sufficient tension being applied by means of said bolt to contract the flanged walls of the keeper plate inwardly upon the reduced portion of the crosshead so as to engender a substantial amount of frictional engagement between said parts, supplementing the positive engagement.

It will be observed that in the position shown in Fig. 1 of the drawings, the marker is resting upon the lefthand side of the machine under its own weight which may be supplemented, in order to cause said marker to bear more firmly against the ground, by an adjustment of the operating lever 9 to the left, so as to compress the spring 39, and utilize its stress against the collar 38, the spring 17 being at the same time under tension. If it is desired to swing the marker to the opposite side into the position shown in dotted lines in said figure, the latch lever is actuated to release the detent and, by a quick movement, assisted by the spring 17, the operating lever is swung to the right, the entire length of the segment and back again. The marker bar and marker will inscribe an arc above the machine and down to the ground on the righthand side, the crank arm 33 passing from the position shown in full lines in said figure to that shown in dotted lines. During the descent of the marker arm, the spring 17 is again placed under tension and thus serves as a yielding brake upon the descending movement of the bar, and the marker is caused to press more or less strongly against the ground by the final adjustment of the operating lever placing the spring 39 under more or less compression.

If a stump is seen in the path of the marker, the operating lever 9 may be actuated to a slight extent to raise the marker above the obstruction, but in case an obstruction is inadvertently encountered, which might otherwise break some part of the mechanism if a rigid connection were employed between the marker bar and the stub shaft, the frictional engagement between the crosshead and the keeper permits the marker bar to swing to the rear about the bolt 48 as a pivot if the obstruction is sufficiently unyielding to snap the fragile line 42 which serves normally to carry said marker instead of throwing the strain thereof entirely upon the frictional engagement between the marker bar and crosshead.

It will thus be observed that the present invention provides a very simple and efficient means for manipulating the marker bar under normal conditions in combination with emergency means permitting the disconnection of the parts under extraordinary circumstances to prevent damage.

What is claimed is:

1. A device of the class described comprising a marker bar arranged to extend transversely of the line of travel, a bearing bracket, means for connecting the bearing bracket to the frame of the planter, a stub shaft mounted in the bearing bracket and extending rearwardly therefrom, means for connecting the marker bar directly to the rear end of the stub shaft, a crank arm separate from the stub shaft, means for rigidly securing the crank arm to the stub shaft at an intermediate point of its length outside the bracket and between the bracket and the marker bar, an operating lever, and means for connecting the outer end of the crank arm to the operating lever.

2. A device of the character described comprising a marker bar arranged to extend transversely of the line of travel and to be swung in an arc, an operating lever, a connection between the lever and the marker consisting of a shaft, a crank arm, and means for connecting the lever with the crank arm, and a connection between the shaft and the marker bar including a wedge, spaced flanges arranged to engage the wedge, and a pivot piercing the flanges and the wedge and having means for causing the flanges to clamp the wedge to maintain the marker bar normally in operative position with relation to the shaft and to permit the marker bar to swing rearwardly when subjected to excessive strain.

3. A device of the class described comprising a marker bar arranged to extend transversely of the line of travel, a bearing bracket, a stub shaft mounted in the bearing bracket and extending rearwardly therefrom, means for connecting the marker bar to the rear end of the stub shaft in spaced relation with the bearing bracket, a crank arm rigidly secured to the shaft between the bearing bracket and the marker bar having an attaching plate at its lower end, said arm extending upwardly from the shaft to a point above the bearing bracket, an operating lever mounted at one side of the bearing bracket, and a transverse rod connecting the operating lever with the crank arm.

4. In a device of the character described including a marker bar arranged to extend transversely of the line of travel, and an operating lever therefor, of a connection between the lever and marker comprising a stub shaft having a crank arm, a link connecting the crank arm and lever, said stub shaft having a transverse head of wedge-shaped cross section and widening outwardly, a keeper mounted on the bar and provided with spaced flanges embracing a slot extending longitudinally of the bar, said slot adapted to receive the wedge-shaped head, and means to pivot the keeper to the head and to compress the flanges inwardly to frictionally engage said head.

5. In a device of the character described including a marker bar arranged to be extended transversely of the line of travel, and to be swung in an arc, and an operating lever, of a connection between the lever and marker comprising a stub shaft bearing an angular crank arm, a link connected to the crank arm and slidably connected to the lever, abutments on the link on opposite sides of the lever, a compression spring mounted on the link and bearing respectively against the lever and against the abutment between said lever and crank arm, an expansion spring connecting the opposite arm of said lever and a fixed support, the stub shaft having a transverse head of wedge shape cross section thickened outwardly, a keeper mounted on the marker bar and comprising spaced flanges embracing a slot extending longitudinally of the bar, said slot adapted to receive the thickened edge of the cross head with the flanges overlying the reduced portions thereof, and means to pivotally clamp said flanges upon the reduced portion of the cross head to effect a frictional engagement between the crosshead and keeper throughout their longitudinal extent.

6. A device of the class described comprising a marker bar arranged to extend transversely of the line of travel, a bearing bracket, means for connecting the bearing bracket to the frame of a planter, a stub shaft mounted in the bearing bracket and extending rearwardly therefrom, a crank arm separate from the stub shaft, means for rigidly securing the crank arm to the stub shaft at an intermediate point of its length outside of the bracket between the bracket and the marker bar, an operating lever, means for connecting the outer end of the crank arm to the stub shaft, and yieldable means for connecting the marker bar directly to the stub shaft, said yieldable means maintaining the marker bar in operative position under normal strains and adapted to permit the marker bar to swing rearwardly independently of the operating means when the marker bar is subjected to an excessive strain.

In testimony, that I claim the foregoing as my own, I have hereto affixed my signature in the presence of two witnesses.

JOHN CARNEY.

Witnesses:
BERNARD J. CARNEY,
J. C. CORBETT.

---

Copies of this patent may be obtained for five cents each, by addressing the "Commissioner of Patents, Washington, D. C."